Jan. 8, 1952 — A. J. BOIVIN — 2,581,833
TOWING HITCH
Filed May 4, 1948 — 2 SHEETS—SHEET 1
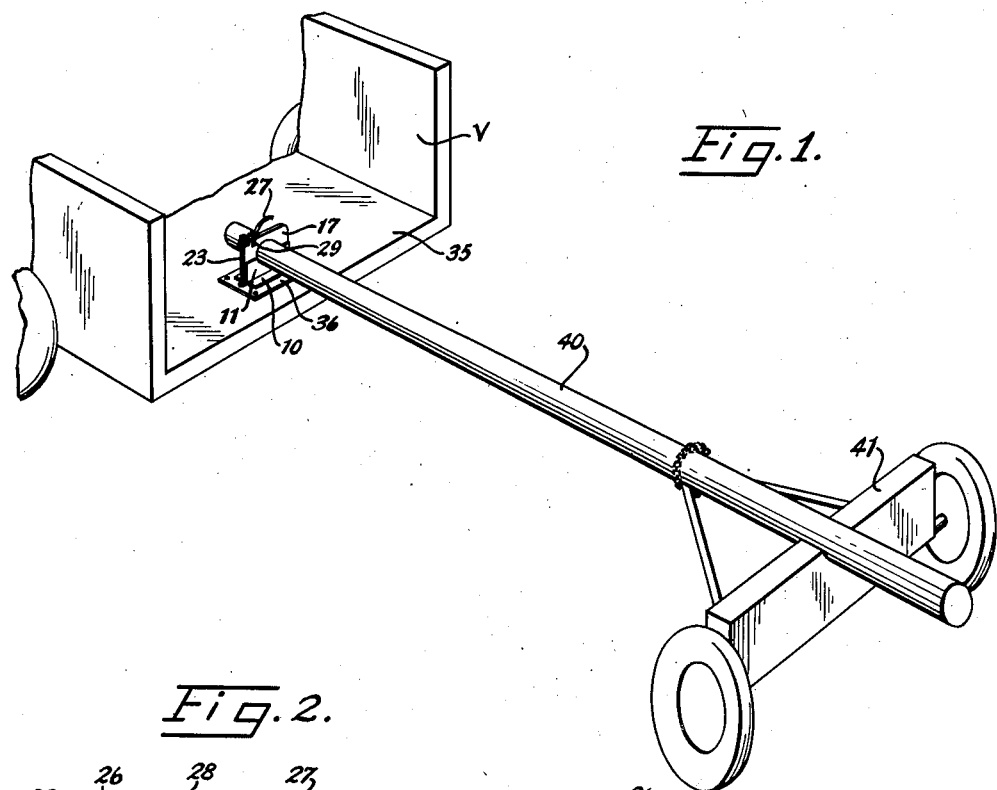
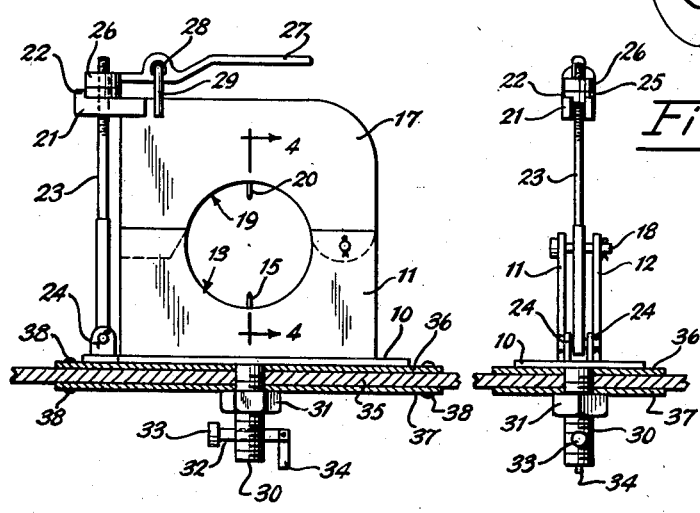
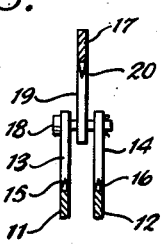
INVENTOR.
ALBERT J. BOIVIN.
BY Jan. 8, 1952 — A. J. BOIVIN — 2,581,833
TOWING HITCH
Filed May 4, 1948 — 2 SHEETS—SHEET 2

INVENTOR.
ALBERT J. BOIVIN.

Patented Jan. 8, 1952

2,581,833

UNITED STATES PATENT OFFICE 2,581,833

TOWING HITCH

Albert J. Boivin, Rumford, Maine

Application May 4, 1948, Serial No. 24,972

12 Claims. (Cl. 280—33.44)

This invention relates to a towing hitch and more particularly to a swivel mounted towing hitch of the jaw type.

A principal object of this invention is to provide a towing hitch which is of simple, sturdy and compact construction and one which may be easily and quickly mounted in operable towing position and easily and quickly demountable from a towing vehicle and may be easily and quickly engaged with or disengaged from a tow, such, for instance, as a power pole or the like, or the draw bar or coupling bar of a trailer or other towable structure.

A further object of this invention is to provide a simple and sturdy swivel mounting for the towing hitch and provided with means holding the hitch in swivel mounted position and locked against becoming dismounted inadvertently due to shocks, strains and vibrations to which it may be subjected.

Another object of this invention is to provide simple, sturdy and effective means whereby the opposing jaws of a hitch may be easily and quickly engaged, and drawn together to firmly and securely clamp with the tow, and hold the jaws against loosening their engagement with the tow; and whereby, when in said tow clamping engagement, the jaws may be easily and quickly freed to allow the jaws to be separated to release the tow.

Other objects of this invention will be in part obvious and in part pointed out hereinafter.

In accordance with this invention the towing hitch includes a stationary jaw and a movable jaw pivoted to the stationary jaw so as to be swingable toward the stationary jaw to clamp a pole or other tow element, or the like, between them and swingable away from the stationary jaw to release the tow element from the hitch. A jaw closing device is provided which is engagable with and disengagable from the movable jaw and, when engaged with the jaw, is operable to force the movable jaw toward the stationary jaw to cause the tow element to be clamped firmly between the two jaws, and locking means are provided for preventing the jaw closing means from becoming loosened by vibrations, strains and shocks, said locking means, however, being easily and quickly manually adjustable to permit the jaw closing means to be easily and quickly loosened from and detached from the stationary jaw to permit the jaws to be opened and the tow piece to be released from the hitch. A simple swivel mounting is also provided for the hitch and means are provided for positively preventing the swivel mounting from becoming loosened and displaced.

The invention accordingly consists in the features of construction, combinations of elements and arrangement of parts which will be pointed out hereinafter and the scope of the application of which will be set forth in the claims that follow.

In order that a clearer understanding of this invention may be had, attention is hereby directed to the accompanying drawings illustrating one possible embodiment of this invention and in which:

Figure 1 is a perspective view of the rear end of a towing vehicle having mounted thereon a towing hitch embodying this invention and engaging a pole which has its rear end supported on a trailer;

Figure 2 is a side view of the towing hitch in mounted position, a portion of the vehicle floor on which the hitch is mounted being shown in section;

Figure 3 is a front view of the same;

Figure 4 is a sectional view of a fragment of the hitch and is taken on the line 4—4 of Fig. 2;

Similar reference characters refer to similar parts throughout the several figures of the drawings.

Figure 5:
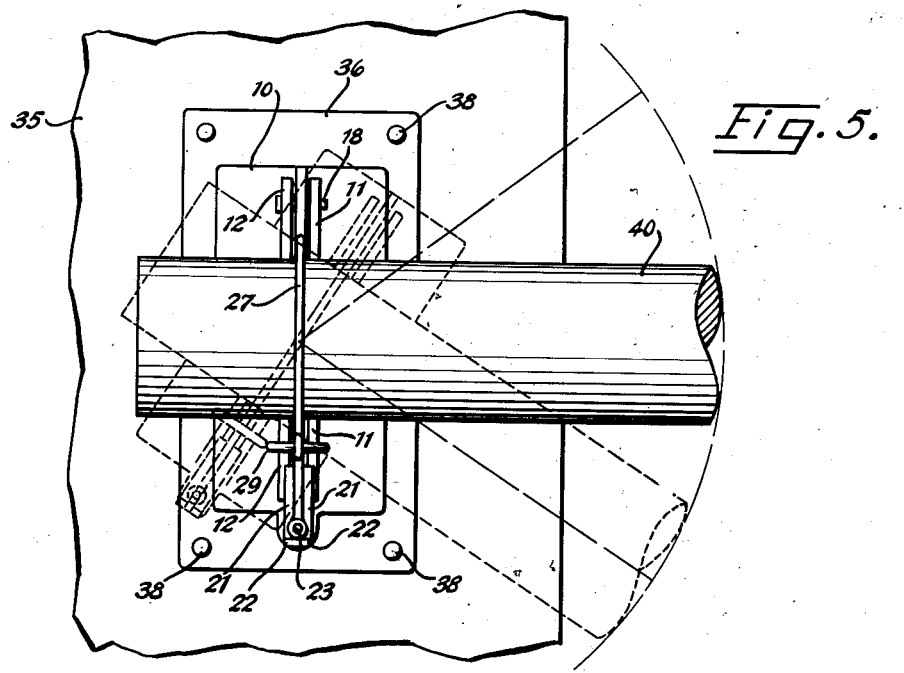
Figure 5 is a top view of the mounted hitch and shows the end portion of the pole engaged thereby and showing in dash lines the hitch and pole portion swung to different positions.
Figure 6:
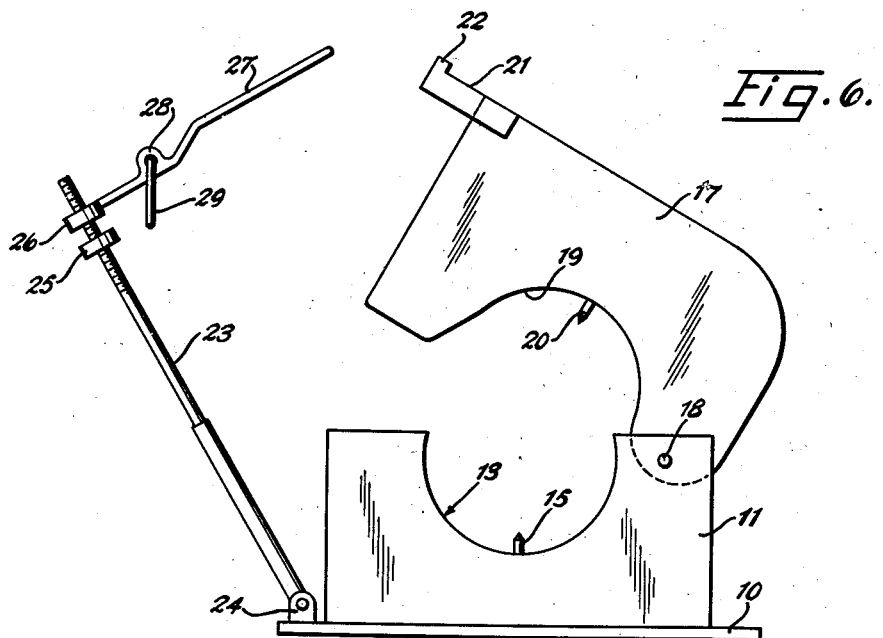
Figure 6 is a side view of the hitch unmounted, showing the jaw closing device disconnected from the jaws and the jaws in relatively open position.

Referring to the drawings the hitch includes a base member 10, which may be a plate of sheet metal, and a stationary jaw member, which may comprise a pair of spaced parallel sheet metal plates 11 and 12, extending upwardly from the base. These jaw plates have aligned tow engaging areas 13 and 14 and prongs 15 and 16 projecting from these surfaces and adapted to bite into a wooden tow piece when seated on these jaw surfaces 13 and 14.

A movable jaw which may be in the form of a metal plate 17 is pivoted adjacent its lower rear corner to and between the stationary jaw plates 11 and 12 adjacent their upper rear corners by means of a pin 18 permitting jaw plate 17 to be swung downwardly between the plates 11 and 12, and upwardly therefrom, plate 17 having a tow engaging portion 19 similar to the tow engaging portions 13 and 14 of the plates 11 and 12 and presented toward them and adapted to engage from above a tow element seated in the portions 13 and 14 of the plates 11 and 12, this portion 19 of plate 17 having a tow engaging prong 20 similar to the prongs 15 and 16 of the stationary jaw parts 11 and 12.

The movable jaw 17 is provided at its upper forward corner with a formation consisting of projecting elements 21 which present an open notch between them and each having an upwardly presented shoulder 22 at its outer end, the notch being adapted to receive the threaded upper end of a bolt 23 which, at its lower end, is pivoted in a bracket 24 which is fixed on the base plate 10 in front of the front ends of the stationary jaw parts 11 and 12; this pivotal mounting of the bolt permitting the bolt to be swung into and out of the notch formed by the notched members 21 of the movable jaw 17. A washer 25 is provided on the bolt 23 and is adapted to seat on the projecting elements 21 and behind the shoulders 22 thereon when the bolt is seated in the notch between the projections 21, and a nut 26 is threaded on the bolt above the washer 25 and is adapted to be screwed down along the bolt when seated between the projections 21 to force the movable jaw plates 17 downwardly against a tow piece disposed between the jaws and thus to clamp the tow piece between the stationary and movable jaw members. Nut 26 is preferably provided with a handle 27 which is fixed to the nut and whereby the nut may be turned easily and quickly in either direction on the bolt 23. Handle 27 is provided with a formation 28 which presents an aperture in which is swingingly disposed an U-shaped element 29 which is adapted, when the bolt is in the notch between the projections 21 and the handle 27 is parallel with and over jaw plate 17, to straddle the top of jaw plate 17 and thus prevent turning of the handle and the nut 26 on the bolt 23 and thus loosening of the nut 26 is prevented until the U-shaped member 29 is lifted out of straddling position with respect to the jaw plate 17.

Extending from the undersurface of base plate 10 at its center is a bolt 30 and this bolt is provided with a nut 31 and a removable element which, when in place, prevents the nut 31 from becoming detached from the bolt 30. This locking element may comprise a pin having a shank 32 with a head 33 at one end and a shank extension 34 at the other end which is swingably pivoted to the end of the main shank portion 32. The bolt is provided with a suitable perforation through which the shank extension 34 may be slid and the shank portion 32 extended whereupon the shaft extension 34 will fall into vertical position by gravity and thus prevent the pin from being jarred out of the bolt and the pin will prevent the nut 31 from becoming unscrewed from the bolt. At the same time the locking pin is easily and quickly removable from the bolt to permit the nut 31 to be taken off the bolt and the towing hitch dismounted from the towing vehicle; and obviously the locking pin may be quickly and easily put in place in the bolt when desired.

The hitch may be easily and quickly mounted on a supporting member such, for instance, as the floor 35 or other supporting element of a vehicle V by merely extending the bolt 30 through a suitable hole provided therefor in the support 35, screwing the nut on the bolt and up toward the underside of the support 35 and then placing the locking pin through the bolt beneath the nut 31. The towing hitch will thus be swivel mounted on the support 35. Preferably, and particularly if the support 35 is wood, a flat piece of sheet metal 36 is secured to the top of the support 35 so that the base plate 10 of the hitch will rest thereon and another flat metal plate 37 is secured to the underside of the support 35 for the nut 31 to engage against when screwed up on the bolt. Plates 36 and 37 may be secured to support 35 by means of screws 38 or by bolts or rivets or, if support 35 is metal, by welding or the like. The plates 36 and 37 are provided with suitable aligned holes for the bolt 30 to extend through.

Assuming that the towing hitch is not mounted and it is desired to use the hitch on a vehicle which has previously been provided with a suitable hole to receive the bolt 30, to mount the hitch in place it is merely necessary to extend the bolt 30 through the hole provided therefor and to screw the nut 31 on the bolt and insert the locking pin. Assuming then that it is desired to engage something such as, for instance, pole 40 with the hitch in towing engagement therewith, it is only necessary to swing the movable jaw plate 17 away from the stationary jaw plates 11 and 12 to permit the end of the pole to be seated on the pole-engaging surfaces 13 and 14 of the stationary jaw plates and then swing the movable jaw plate 17 down upon the pole, swing the bolt 23 into the notch between the projections 21, allow the washer 25 to fall on the projections 21 and behind the shoulders 22 thereon and then, by means of handle 27, screw the nut 26 down on the bolt, meanwhile keeping the U-shaped lock element 29 raised so as not to strike the jaw plate 17, and continue to screw nut 26 down on the bolt 23 until the pole has been clamped firmly and tightly between the stationary jaw portions 11 and 12 and the movable jaw portion 17 with the prongs 15, 16 and 20 of the jaw members biting into the pole. If the handle 27 is stopped in position over and parallel with the upper edge of jaw plate 17 and the locking element 29 is then released the locking element will fall into straddling position over the top of jaw plate 17 and the nut 26 will be locked against becoming loosened on the bolt 23. The pole 40 will thus be tightly and securely anchored to the towing hitch and to the towing vehicle on which the hitch is mounted and, at the same time, swivel movement of the hitch and the pole relatively to the towing vehicle is provided for.

To release the pole from the hitch it is only necessary to raise the locking element 29 out of abutting relation to the sides of the jaw plate 17 and to unscrew the nut 26 on the bolt 23 sufficiently to permit the washer 25 to be raised above the shoulder 22 and then swing the bolt 23 out from between the projections 21. This leaves jaw plate 17 free to be moved upwardly out of engagement with the pole and the pole free to be lifted out of engagement with the stationary jaw plates 11 and 12.

The hitch may be easily and quickly dismounted from the towing vehicle by merely removing the locking pin from the bolt 30, unscrewing the nut 31 from the bolt and lifting the hitch from the vehicle.

In Figure 1 the rear end of the pole 40 is shown as being supported on a wheeled trailer truck 41.

A towing hitch constructed in accordance with this invention is exceptionally well suited to serve as a towing accessory of a power service truck. However, it is to be understood that the towing hitch of this invention is adapted to uses other than the towing of power poles and is adapted to use in other environments, such, for instance, as for the towing of trailers or other towable structures, the only requirement being that what is to be towed is provided with something that may be properly engaged between the stationary jaw members 11 and 12 and the movable jaw member 17.

It is to be understood that all matter contained in the above description or shown in the accompanying drawings be interpreted as illustrative and not in a limiting sense.

That which is claimed, as new, is:

1. A towing hitch of the character described including, in combination, a base, a stationary jaw mounted on said base, a movable jaw complementary to the stationary jaw and pivoted thereon to be swingable to and from jaw closing position with respect to the stationary jaw, said movable jaw having a formation presenting a projecting open notch and upwardly extending shoulders adjacent the open end of the notch, a bolt pivotally mounted on said base so as to be swingable into and out of said notch, the portion of the bolt disposable in the notch being threaded, and a nut on the bolt adapted when the bolt is disposed in the notch to be above said notch formation and to the rear of said shoulders thereof and adapted to be screwed down on the bolt to force the movable jaw in jaw closing direction and cause a tow element between the jaws to be clamped between them.

2. A towing hitch of the character described including, in combination, a base, a stationary jaw mounted on said base, a movable jaw complementary to the stationary jaw and pivoted thereon to be swingable to and from jaw closing position with respect to the stationary jaw, said jaws having cooperating tow engaging surfaces facing each other and a prong extending from each of said surfaces in position to engage a tow element disposed between the jaws, said movable jaw having a formation presenting a projecting open notch and upwardly extending shoulders adjacent the open end of the notch, a bolt pivotally mounted on said base so as to be swingable into and out of said notch, the portion of the bolt disposable in the notch being threaded, a washer on the bolt adapted when the bolt is disposed in the notch to seat on said notch formation and behind the said shoulders thereof, and a nut on the bolt adapted to be screwed down thereon to force the movable jaw in jaw closing direction and cause a tow element between the jaws to be clamped between them.

3. A towing hitch of the character described including, in combination, a base, a pair of spaced parallel stationary jaw plates extending upwardly from said base, a movable jaw plate pivoted on and between said stationary jaw plates to be swingable to and from jaw closing position with respect to the stationary jaw plates, and a jaw closing device connected to said base and engageable with the movable jaw and operable to force the movable jaw against a tow element positioned between said jaws to clamp said tow element between said jaws, said device being disengageable from the movable jaw to permit the movable jaw to be swung out of engagement with the tow element to release the tow element and to permit the tow element to be disengaged from the hitch.

4. A towing hitch of the character described including, in combination, a base, a pair of spaced parallel stationary jaw plates extending upwardly from said base having aligned tow engaging surfaces at their upper edges, a movable jaw plate pivoted on and between said stationary jaw plates to be swingable to and from jaw closing position with respect to the stationary jaw plates and having a tow engaging surface at its lower edge in cooperating relation to the tow engaging surfaces of said stationary jaw plates and a jaw closing device connected to said base and engageable with the movable jaw and operable to force the movable jaw against a tow element positioned between said jaws to clamp said tow element between said jaws, said device being disengageable from the movable jaw to permit the movable jaw to be swung out of engagement with the tow element to release the tow element and to permit the tow element to be disengaged from the hitch.

5. A towing hitch of the character described including, in combination, a base, a pair of spaced parallel stationary jaw plates extending upwardly from said base and having aligned tow engaging surfaces at their upper edges, a movable jaw plate pivoted on and between said stationary jaw plates to be swingable to and from jaw closing position with respect to the stationary jaw plates and having a tow engaging surface at its lower edge in cooperating relation to the tow engaging surfaces of said stationary jaw plates, each of said stationary jaw plates having a tow engaging prong extending upwardly from its tow engaging surface and said movable jaw plate having a tow engaging prong extending downwardly from its tow engaging surface, and a jaw closing device connected to said base and engageable with the movable jaw and operable to force the movable jaw against a tow element positioned between said jaws to clamp said tow element between said jaws, said device being disengageable from the movable jaw to permit the movable jaw to be swung out of engagement with the tow element to release the tow element and to permit the tow element to be disengaged from the hitch.

6. A towing hitch of the character described including, in combination, a base, a pair of spaced parallel stationary jaw plates extending upwardly from said base and having aligned tow engaging surfaces at their upper edges, a movable jaw plate pivoted on and between said stationary jaw plates to be swingable to and from jaw closing position with respect to the stationary jaw plates, said movable jaw having a formation presenting a projecting open notch and upwardly extending shoulders adjacent the open end of the notch, a bolt pivotally mounted on said base so as to be swingable into and out of said notch, the portion of the bolt disposable in the notch being threaded, a washer on the bolt adapted when the bolt is disposed in the notch to seat on said notch formation and behind the said shoulders thereof, and a nut on the bolt adapted to be screwed down thereon to force the movable jaw in jaw closing direction and cause a tow element between the jaws to be clamped between them.

7. A towing hitch of the character described including, in combination, a base, a pair of spaced parallel stationary jaw plates extending upwardly from said base and having aligned tow engaging surfaces at their upper edges, a movable jaw plate pivoted on and between said stationary jaw plates to be swingable to and from jaw closing position with respect to the stationary jaw plates, said movable jaw having a formation presenting a projecting open notch and upwardly extending shoulders adjacent the open end of the notch, a bolt pivotally mounted on said base so as to be swingable into and out of said notch, the portion of the bolt disposable in the notch being threaded, a washer on the bolt adapted when the bolt is disposed in the notch to seat on said notch formation and behind the said shoulders thereof, and a nut on the bolt adapted to be screwed down thereon to force the movable jaw in jaw closing direction and cause a tow element between the jaws to be clamped between them, and a swivel mounting for the hitch, said mounting comprising a threaded swivel pin extending downwardly from the under side of the base at its center and having a transverse aperture for a locking pin, a nut adapted to be threaded on the pin to be above said aperture and a locking pin disposed through said aperture whereby the nut is prevented from coming off of the bolt.

8. A towing hitch of the character described including, in combination, a base, a pair of spaced parallel stationary jaw plates extending upwardly from said base and having aligned tow engaging surfaces at their upper edges, a movable jaw plate pivoted on and between said stationary jaw plates to be swingable to and from jaw closing postion with respect to the stationary jaw plates, said movable jaw having a formation presenting a projecting open notch and upwardly extending shoulders adjacent the open end of the notch, a bolt pivotally mounted on said base so as to be swingable into and out of said notch, the portion of the bolt disposable in the notch being threaded, a washer on the bolt adapted when the bolt is disposed in the notch to seat on said notch formation and behind the said shoulders thereof, and a nut on the bolt adapted to be screwed down thereon to force the movable jaw in jaw closing direction and cause a tow element between the jaws to be clamped between them, and a swivel mounting for the hitch, said mounting comprising a threaded swivel pin extending downwardly from the under side of the base at its center and having a transverse aperture for a locking pin, a nut adapted to be threaded on the pin to be above said aperture and a locking pin disposed through said aperture whereby the nut is prevented from coming off of the bolt, said locking pin having a swinging end portion adapted to fall by gravity into a position transverse to the axis of the pin preventing inadvertent displacement of the pin from said aperture.

9. A towing hitch of the character described including, in combination, a base, a pair of spaced parallel stationary jaw plates extending upwardly from said base and having aligned tow engaging surfaces at their upper edges, a movable jaw plate pivoted on and between said stationary jaw plates to be swingable to and from jaw closing position with respect to the stationary jaw plates, and having a tow engaging surface at its lower edge in cooperating relation to the tow engaging surfaces of said stationary jaw plates, each of said stationary jaw plates having a tow engaging prong extending upwardly from its tow engaging surface and said movable jaw plate having a tow engaging prong extending downwardly from its tow engaging surface, said movable jaw having a formation presenting a projecting open notch and upwardly extending shoulders adjacent the open end of the notch, a bolt pivotally mounted on said base so as to be swingable into and out of said notch, the portion of the bolt disposable in the notch being threaded, a washer on the bolt adapted when the bolt is disposed in the notch to seat on said notch formation and behind the said shoulders thereof, and a nut on the bolt adapted to be screwed down thereon to force the movable jaw in jaw closing direction and cause a tow element between the jaws to be clamped between them, and a swivel mounting for the hitch, said mounting comprising a threaded swivel pin extending downwardly from the under side of the base at its center and having a transverse aperture for a locking pin, a nut adapted to be threaded on the pin to be above said aperture and a locking pin disposed through said aperture whereby the nut is prevented from coming off of the bolt, said locking pin having a swinging end portion adapted to fall by gravity into a position transverse to the axis of the pin preventing inadvertent displacement of the pin from said aperture.

10. A towing hitch of the character described including, in combination, a base, a stationary jaw mounted on said base, a movable jaw complementary to the stationary jaw and pivoted thereon to be swingable to and from jaw closing position with respect to the stationary jaw, said movable jaw having a formation presenting a projecting open notch and upwardly extending shoulders adjacent the open end of the notch, a bolt pivotally mounted on said base so as to be swingable into and out of said notch, the portion of the bolt disposable in the notch being threaded, and a nut on the bolt adapted when the bolt is disposed in the notch to be above said notch formation and adapted to be screwed down on the bolt to force the movable jaw in jaw closing direction and causing a tow element between the jaws to be clamped between them, said nut having a fixed laterally extending handle portion and a locking device mounted on the handle portion and engageable with the movable jaw when the handle portion is in alignment over the jaw preventing the turning of the handle portion and nut on the bolt.

11. A towing hitch of the character described including, in combination, a base, a stationary jaw mounted on said base, a movable jaw complementary to the stationary jaw and pivoted thereon to be swingable to and from jaw closing position with respect to the stationary jaw, said movable jaw having a formation presenting a projecting open notch and upwardly extending shoulders adjacent the open end of the notch, a bolt pivotally mounted on said base so as to be swingable into and out of said notch, the portion of the bolt disposable in the notch being threaded, and a nut on the bolt adapted when the bolt is disposed in the notch to be above said notch formation and adapted to be screwed down on the bolt to force the movable jaw in jaw closing direction and cause a tow element between the jaws to be clamped between them, said nut having a fixed laterally extending handle portion and a U-shaped locking member swingingly mounted in inverted position on said handle portion and adapted to straddle the top of the movable jaw when the handle portion is in alignment thereover and prevent the turning of the handle portion and nut relatively to the bolt, said locking member being manually raisable out of engagement with the movable jaw permitting turning of the handle and nut on the bolt.

12. A towing hitch of the character described including, in combination, a base, a pair of spaced parallel stationary jaw plates extending upwardly from said base and having aligned tow engaging surfaces at their upper edges, a movable jaw plate pivoted on and between said stationary jaw plates to be swingable to and from jaw closing position with respect to the stationary jaw plates and having a tow engaging surface at its lower edge in cooperating relation to the tow engaging surfaces of said stationary jaw plates, each of said stationary jaw plates having a tow engaging prong extending upwardly from its tow engaging surface and said movable jaw plate having a tow engaging prong extending downwardly from its tow engaging surface, said movable jaw having a formation presenting a projecting open notch and upwardly extending shoulders adjacent the open end of the notch, a bolt pivotally mounted on said base so as to be swingable into and out of said notch, the portion of the bolt disposable in the notch being threaded, a washer on the bolt adapted when the bolt is disposed in the notch to seat on said notch formation and behind the said shoulders thereof, and a nut on the bolt adapted to be screwed down thereon to force the movable jaw in jaw closing direction and cause a tow element between the jaws to be clamped between them, said nut having a fixed laterally extending handle portion and a U-shaped locking member swingingly mounted in inverted position on said handle portion and adapted to straddle the top of the movable jaw when the handle portion is in alignment thereover and prevent the turning of the handle portion and nut relatively to the bolt, said locking member being manually raisable out of engagement with the movable jaw permitting turning of the handle and nut on the bolt.

ALBERT J. BOIVIN.

REFERENCES CITED

The following references are of record in the file of this patent:

UNITED STATES PATENTS

| Number | Name | Date |
|---|---|---|
| 1,539,943 | Greve | Dec. 2, 1925 |
| 1,760,130 | Forrest | May 27, 1930 |
| 2,139,970 | Moore | Dec. 13, 1938 |
| 2,361,362 | Altgelt | Oct. 31, 1944 |